US008569659B2

(12) United States Patent
Kim

(10) Patent No.: US 8,569,659 B2
(45) Date of Patent: Oct. 29, 2013

(54) HEATER-INTEGRATED CANISTER UNIT

(75) Inventor: Myeonghwan Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 136 days.

(21) Appl. No.: 13/210,979

(22) Filed: Aug. 16, 2011

(65) Prior Publication Data
US 2012/0111848 A1 May 10, 2012

(30) Foreign Application Priority Data

Nov. 8, 2010 (KR) .................. 10-2010-0110482

(51) Int. Cl.
F27D 11/00 (2006.01)
F27B 1/26 (2006.01)

(52) U.S. Cl.
USPC ........... 219/385; 219/202; 219/205; 219/206; 219/207; 432/36; 60/279; 60/283; 60/278; 60/288; 60/295

(58) Field of Classification Search
USPC ........ 219/385, 202, 205–207; 60/279, 283–4, 60/278, 288–9, 295; 432/36
See application file for complete search history.

(56) References Cited

U.S. PATENT DOCUMENTS 8,375,701 B2 * 2/2013 Lupescu et al. ................ 60/279

FOREIGN PATENT DOCUMENTS

| JP | 50-5716 | | 1/1975 |
| JP | 2002-70660 | A | 3/2002 |
| JP | 2004-68696 | A | 3/2004 |
| JP | 2004068696 | * | 3/2004 |
| JP | 2007-297957 | A | 11/2007 |
| JP | 2009-156030 | A | 7/2009 |
| KR | 20-0156191 | Y1 | 9/1999 |
| KR | 2003-0085530 | A | 11/2003 |

* cited by examiner

Primary Examiner — Shawntina Fuqua
(74) Attorney, Agent, or Firm — Morgan, Lewis & Bockius LLP

(57) ABSTRACT

A heater-integrated canister unit may include a canister, a temperature controller integrally coupled with the canister to indirectly heat a charcoal inside the canister by increasing a temperature of a space in the canister, and an electronic control unit controlling the current supplied to the temperature controller. The temperature controller may be disposed at the opposite side of the evaporation gas intake port in the canister and support the charcoal or may be coupled to the outside of the canister by a seating slot formed in the canister. The temperature controller may include a heater plate transmitting the current by forming a positive electrode and a negative electrode, a connector supplying the current to the heater plate and a heater generating heat on the heater plate.

6 Claims, 10 Drawing Sheets

HEATER-INTEGRATED CANISTER UNIT

CROSS-REFERENCE TO RELATED APPLICATIONS

The present application claims priority of Korean Patent Application Number 10-2010-0110482 filed Nov. 8, 2010, the entire contents of which application is incorporated herein for all purposes by this reference.

BACKGROUND OF INVENTION

1. Field of Invention

The present invention relates to a canister unit, and more particularly, to a heater-integrated canister unit of which absorbing/detaching efficiency is improved by increasing the temperature of the charcoal in the canister.

2. Description of Related Art

In general, canister systems collect/store hydrocarbon (HC) in the evaporation gas produced by evaporation of fuel when a vehicle stops, travels, and fills a fuel tank, and send the collected/stored hydrocarbon (HC) to the combustion chamber, using engine intake pressure when the engine is turned on.

The canister systems include a canister filled with charcoal, an evaporation gas intake channel connected from a fuel tank to the canister, an evaporation gas exhaust channel connected from the canister to the combustion chamber of an engine, and an atmospheric pressure channel connecting the canister with the atmosphere.

Valves that are controlled to open/close by an electronic control unit (ECU) are disposed in the channels.

By using the canister systems, it is possible to collect/store hydrocarbon (HC) by sending the evaporation gas (air+hydrocarbon evaporation gas) in the fuel tank to the canister when a vehicle is filling the fuel tank or stopped, whereas it is possible to burn the hydrocarbon (HC) collected in the canister by sending the hydrocarbon to the combustion chamber using the intake pressure of the engine when the vehicle travels.

That is, the evaporation gas intake channel connecting the fuel tank with the canister and the atmospheric pressure channel connecting the canister with the atmosphere are opened when the vehicle is filling the fuel tank or stopped, whereas the evaporation gas exhaust channel connecting the canister with the combustion chamber of the engine and the atmospheric pressure channel connecting the canister with the atmosphere are opened when the vehicle travels.

In general, the performance of the canister system depends on the canister and the performance of the canister depends on the performance of the charcoal particles that adsorb and detach the hydrocarbon (HC).

PZEV (Partial Zero Emission Vehicle), which is an environmental rule in North America, reinforces a request of reducing emission, such as hydrocarbon (HC) contained in the evaporation gas from vehicles, and it is required to increase the performance and efficiency of canisters and the purge performance of an evaporation gas between an engine and a canister in order to satisfy the rule.

In particular, hybrid vehicles and ISG (Idle Stop and Go) vehicles in which the purge rate of a canister without purging in idling necessarily require a canister with increased capacity, which is based on that the reduction of purge rate of the canister increases the hydrocarbon (HC) remaining in the canister and DBL (Diurnal Breathing Loss), which is a regulated test, is decreased under a condition that is directly influenced by the DBL.

FIG. 10 shows a canister with increased capacity and performance installed in a fuel tank to satisfy PZEV, which is a reinforced environmental rule in North America.

As shown in the figure, a canister system includes a main canister 100 installed at a fuel tank 300 and a sub-canister 200 connected to main canister 100, such that the capacity and performance of the canister increases as much as sub-canister 200 provides, thereby satisfying PZEV.

However, the type of main canister 100 equipped with separate sub-canister 200 necessarily increases the cost and weight.

Further, the space for installing sub-canister 200 connected to main canister 100 changes the shape of fuel tank 300, such that it is difficult to ensure capacity of fuel tank 300, and the length increased by sub-canister 200 increases ventilation resistance of a fuel vapor system, such that resistance of air exhaust channel in fuel tank 300 increases.

In particular, the increase in resistance of the air exhaust channel in fuel tank 300 due to sub-canister 200 may make it difficult to fill a vehicle with fuel, or if excessive, may make it impossible to fill a vehicle with fuel.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention have been made in an effort to provide a heater-integrated canister unit that does not have the problems generated from using a specific canister, by increasing the temperature of charcoal to enhance absorbing/detaching efficiency of hydrocarbon (HC) that is absorbed/detached in an endothermic reaction.

Further, Various aspects of the present invention have been made in an effort to provide a heater-integrated canister unit that does not cause changing the layout of a canister system, particularly, changing the design of a fuel tank which causes reduction of capacity, by integrating a heater to a housing accommodating charcoal to indirectly heat the charcoal.

Exemplary heater-integrate canister units of the present invention may include a canister, a temperature controller integrally coupled with the canister to indirectly heat a charcoal inside the canister by increasing a temperature of a space in the canister, and an electronic control unit controlling the current supplied to the temperature controller.

The temperature controller may be disposed at the opposite side of the evaporation gas intake port in the canister and support the charcoal without moving. The temperature controller may be closed by a cover, in the space inside the canister, and at least one or more elastic members having elasticity are further disposed between the temperature controller and the cover.

The temperature controller may be coupled to the outside of the canister by a seating slot formed in the canister.

The temperature controller may include a heater plate transmitting the current by forming a positive electrode and a negative electrode, a connector supplying the current to the heater plate and a heater generating heat on the heater plate.

The heater plate includes a pair of upper and lower panels, which may be made of aluminum or the like, forming a positive electrode and a negative electrode. The upper and lower panels have a plurality of projections and air holes.

The heater may be of a PTC (Positive Temperature Coefficient) type and one or more of heaters can be provided.

According to the exemplary heater-integrate canister units of the present invention, it is possible to satisfy PZEV, which is a reinforced environmental rule in North America, with only one canister by increasing absorbing/detaching efficiency of hydrocarbon (HC), by using temperature in accordance with characteristics of charcoal absorbing/detaching hydrocarbon (HC) in an endothermic reaction. In particular, the present invention can be sufficiently applied to hybrid vehicles and ISG (Idle Stop and Go) vehicles in which the purge rate of a canister decreases without purging in idling.

Further, since the present invention can satisfy PZEV, which is a reinforced environmental rule in North America, with only one canister, it is possible to reduce or eliminate all the problems due to the increase in cost, weight, and ventilation resistance, which are caused when more canisters are used.

In addition, since the heater increasing the temperature of the charcoal is integrated to the housing accommodating the charcoal, it does not need to change the layout of the canister system and the design of the fuel tank.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
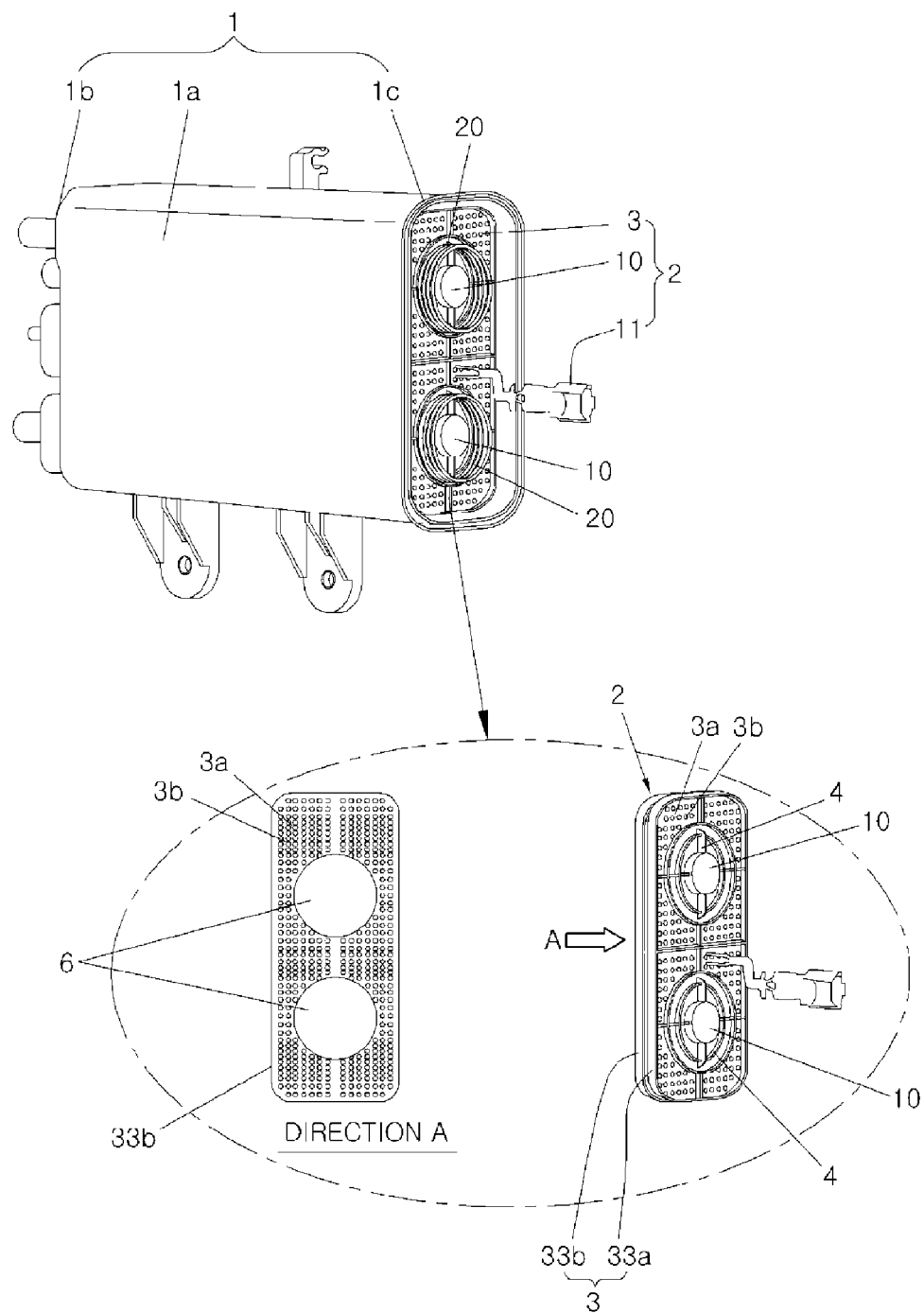
FIG. 1 is a view showing the configuration of an exemplary heater-integrated canister unit according to the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, exemplary canister units according to the present invention include a canister 1 filled with charcoal and a temperature controller 2 coupled with the canister 1. The temperature controller 2 may be coupled to a side of canister 1 to block the inside of canister 1 from the outside and controlled by an ECU (Electronic Control Unit) to increase the temperature of the inside by receiving current.

Temperature controller 2 is composed of a heater plate 3 made of a thermally conductive material, in various embodiments preferably materials with high thermal conductivity, a heater 10 generating heat on heater plate 3, and a connector 11 supplying current to heater plate 3. Heater plate 3 may be made of aluminum, or various materials with comparable thermal properties of aluminum.

Heater plate 3 is composed of a pair of upper and lower panels 33a and 33b having a plurality of projections 3a and air holes 3b and forming a positive electrode and a negative electrode, and heater fixing bosses 6 protrude from the opposite sides of upper and lower panels 33a and 33b to fix the position of heater 10.

At least one or more heater fixing bosses 6 may be formed. In various embodiments, two heater fixing bosses may be formed at a predetermined distance therebetween in a pair.

Unlike lower panel 33b, spring seating bosses 4 are further formed at upper panel 33a, corresponding to heater fixing bosses 6.

Heater 10 may be of a PTC (Positive Temperature Coefficient) type and positioned on the pair of heater fixing bosses 6 formed at upper and lower panels 33a and 33bb of heater plate 3.

Connector 11 is connected to upper panel 33a of heater plate 3 as a positive electrode and lower panel 33b as a negative electrode in order to heat heater 10.

Figure 2:
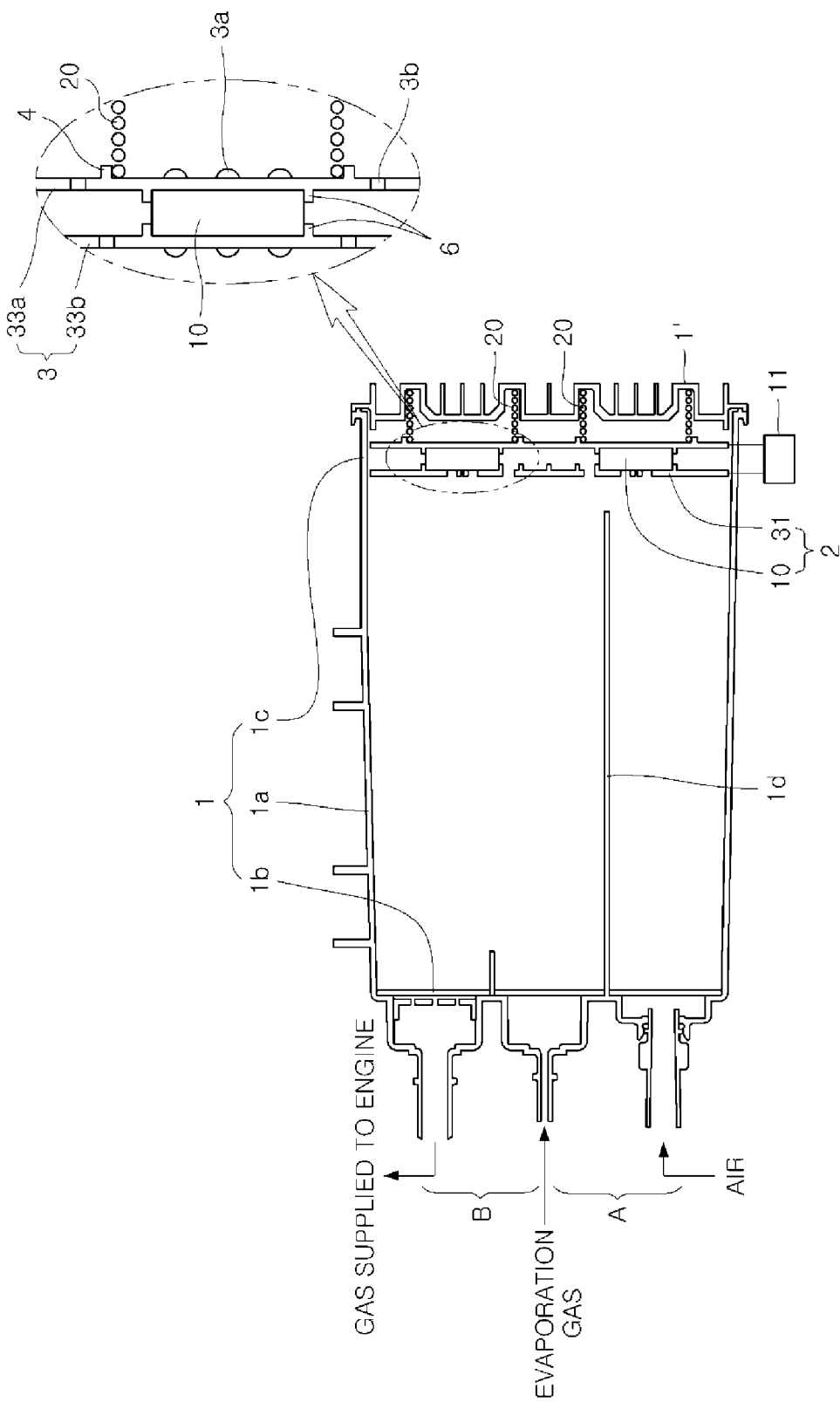
FIG. 2 is a cross-sectional view of an exemplary canister and temperature controller according to the present invention.

Referring to FIG. 2, canister 1 includes a housing body 1a of which the inside divided by a separator 1d is filed with charcoal, and a plurality of pipe connection ports A and B is formed at the top 1b of housing body 1a, while a cover 1' closing the inside of housing body 1a is connected to the bottom 1c, and temperature controller 2 is disposed inside cover 1'.

Temperature controller 2 may be coupled to bottom 1c of canister 1, in various embodiments preferably integrally formed to bottom 1c of canister 1.

A coil spring type of elastic member 20 may be disposed between temperature controller 2 and cover 1', such that it supports temperature controller 2 and prevent movement of the charcoal in canister 1.

Elastic member 20 may be positioned by the pair of spring seating bosses 4 at upper panel 33a of heater plate 3.

Figure 3:
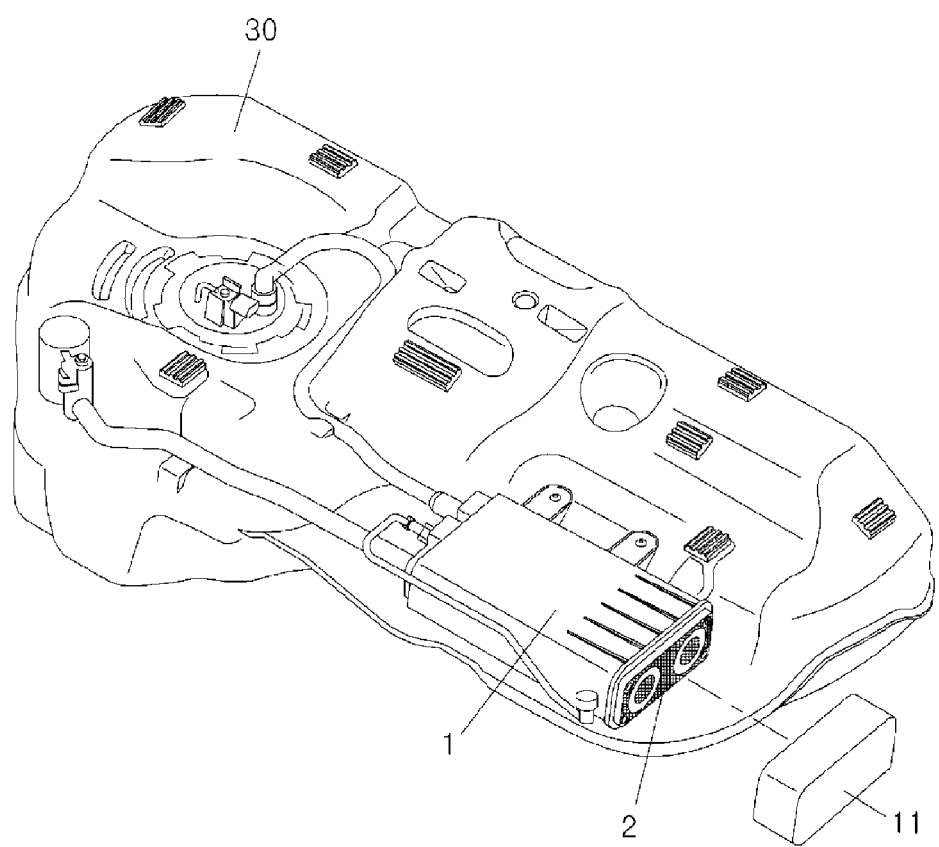
FIG. 3 is a view showing an exemplary fuel tank installed with a heater-integrated canister unit according to the present invention.

Referring to FIG. 3, the exemplary canister systems improve the performance and capacity of canister 1 to satisfy PZEV, which is a reinforced environmental rule in North America, by using only one canister 1 equipped with built-in temperature controller 2 and increasing the performance and capacity of canister 1 with increase in absorbing/detaching performance of the charcoal due to temperature controller 2.

Figure 4:
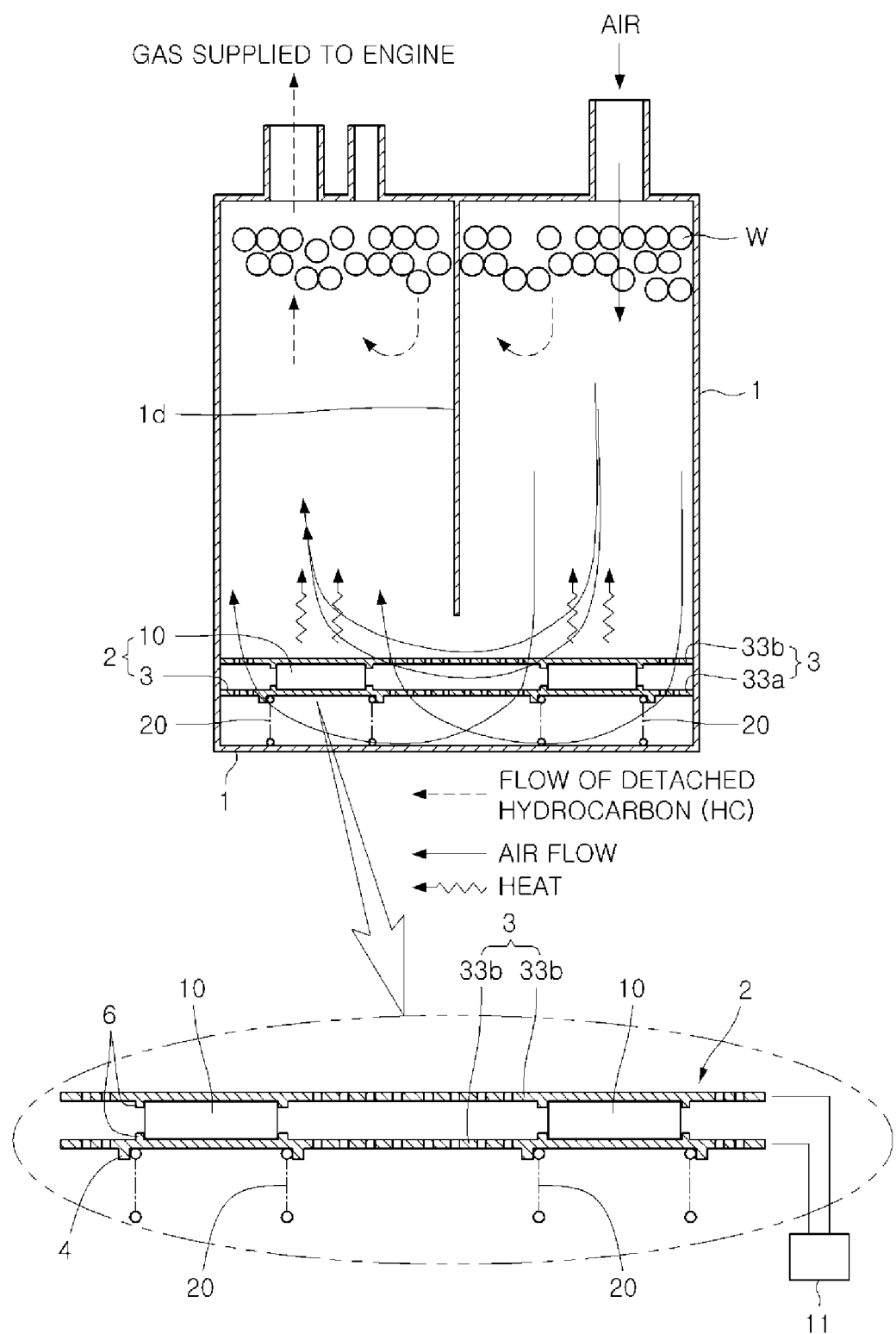
FIG. 4 is a view showing the operation of an exemplary heater-integrated canister unit according to the present invention.

Referring to FIG. 4, the operation of the heater-integrated canister according to various embodiments, temperature controller 2 is disposed in the space closed by cover 1' at bottom 1c of canister 1 and an ECU controlling current supply is connected to connector 11 connected to temperature controller 2 and protruding outside from canister 1.

The charcoal W in canister 1 is supported and fixed by temperature controller 2 and elastic member 20 elastically supporting temperature controller 2 and cover 1' support temperature controller 2, such that the charcoal W is further fixed without moving.

The current supplied to temperature controller 2 through connector 11 heats heater plate 3 composed of the pair of upper and lower panels 33a and 33b forming the positive electrode and the negative electrode. As heater plate 3 is heated, the PTC type of heater 10 generates heat.

The heat generated from heater 10 is transferred to the internal space of canister 1 and heats air flowing inside from the outside and the air heated in the internal space increases the temperature of the charcoal W.

As the temperature of the charcoal W increases, detachment of absorbed hydrocarbon HC, an endothermic reaction, increases in the charcoal W. That is, canister 1 can detach a large amount of hydrocarbon HC by increasing the temperature of the charcoal W.

In this process, the ECU controls the temperature range of the charcoal W at the optimum level by supplying and cutting off the current, because the absorbing/detaching efficiency of hydrocarbon HC is reduced when the temperature of the charcoal W becomes out of an appropriate range.

The optimum temperature control of the charcoal W is designed in accordance with the capacity of the canister and the ECU is provided with a current control logic based on the designed conditions.

Figure 5:
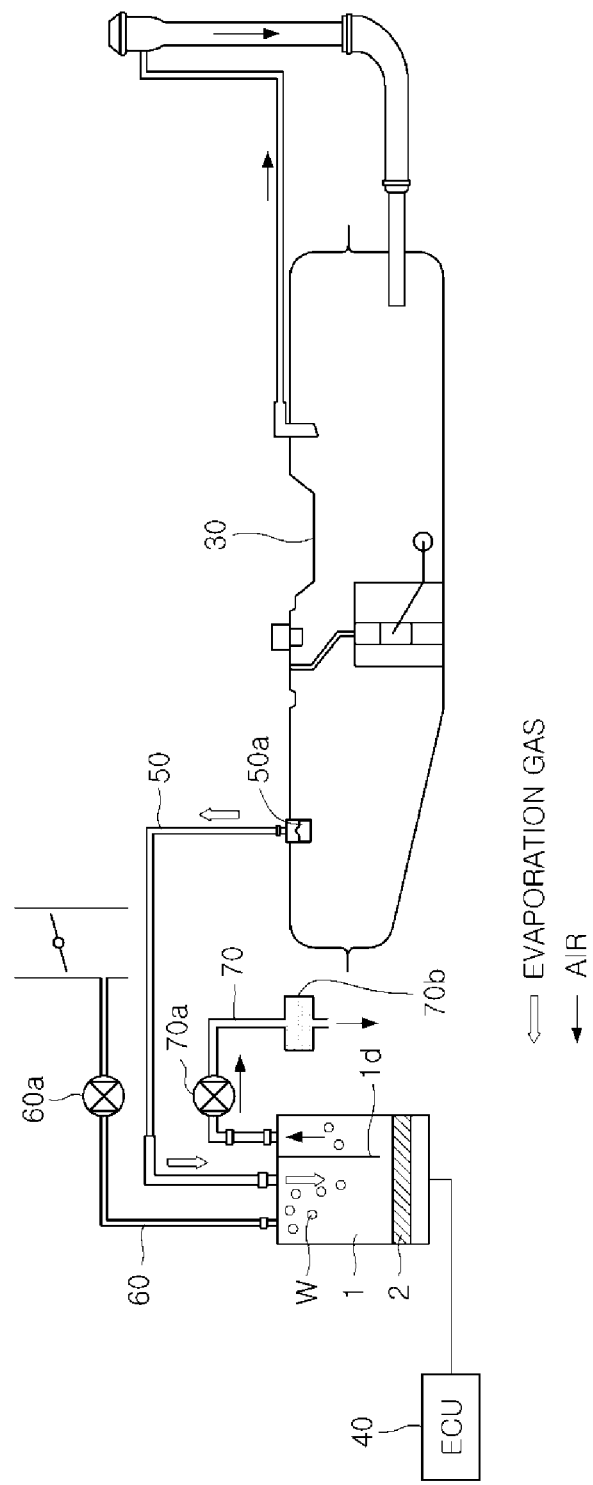
FIG. 5 is a view showing when hydrocarbon (HC) in an evaporation gas of the exemplary heater-integrated canister unit according to the present invention is collected.

Referring to FIG. 5 showing when hydrocarbon HC in an evaporation gas is collected in the heater-integrated canister unit according to various embodiments, an evaporation gas line 50 extending from a fuel tank 30, an evaporation gas exhaust line 60 generating engine intake pressure, and an external air line 70 connected to the atmosphere are connected to canister 1, and an ECU 40 is connected to temperature controller 2 disposed in canister 1 by connector 11 protruding outside through canister 1.

An ROV (Roll Over Valve) type of valve 50a is disposed in evaporation gas line 50, a PCSV (Purge control solenoid valve) type of valve 60a is disposed in evaporation gas exhaust line 60, and a CCV (Canister Close Valve) type of valve 70a and an air filter 70b are disposed in external air line 70.

In the state of FIG. 5, which shows when a vehicle is stopped or filling with fuel, valve 60a is closed and evaporation gas exhaust line 60 is closed. The evaporation gas (air+hydrocarbon (HC)) in fuel tank 30 is sent to canister 1 so that only the air with the hydrocarbon (HC) removed is discharged to the atmosphere.

That is, the evaporation gas flowing out through open valve 50a flows into canister 1 through evaporation gas line 50 and then flows out to the atmosphere through external air line 70.

The evaporation gas flowing in canister 1 in the process described above, comes in contact with the charcoal W first before flowing out to the atmosphere, such that only the air with the hydrocarbon HC removed by being absorbed to the charcoal W in the evaporation gas is discharged to the atmosphere through external air line 70.

The air flowing out to the atmosphere through external air line 70 is filtered and purified by air filter 70b after passing through open valve 70a.

This process does not activate temperature controller 2 in canister 1, which is because the increase in temperature of the charcoal W does not substantially have influence on absorbing the hydrocarbon HC.

Figure 6:
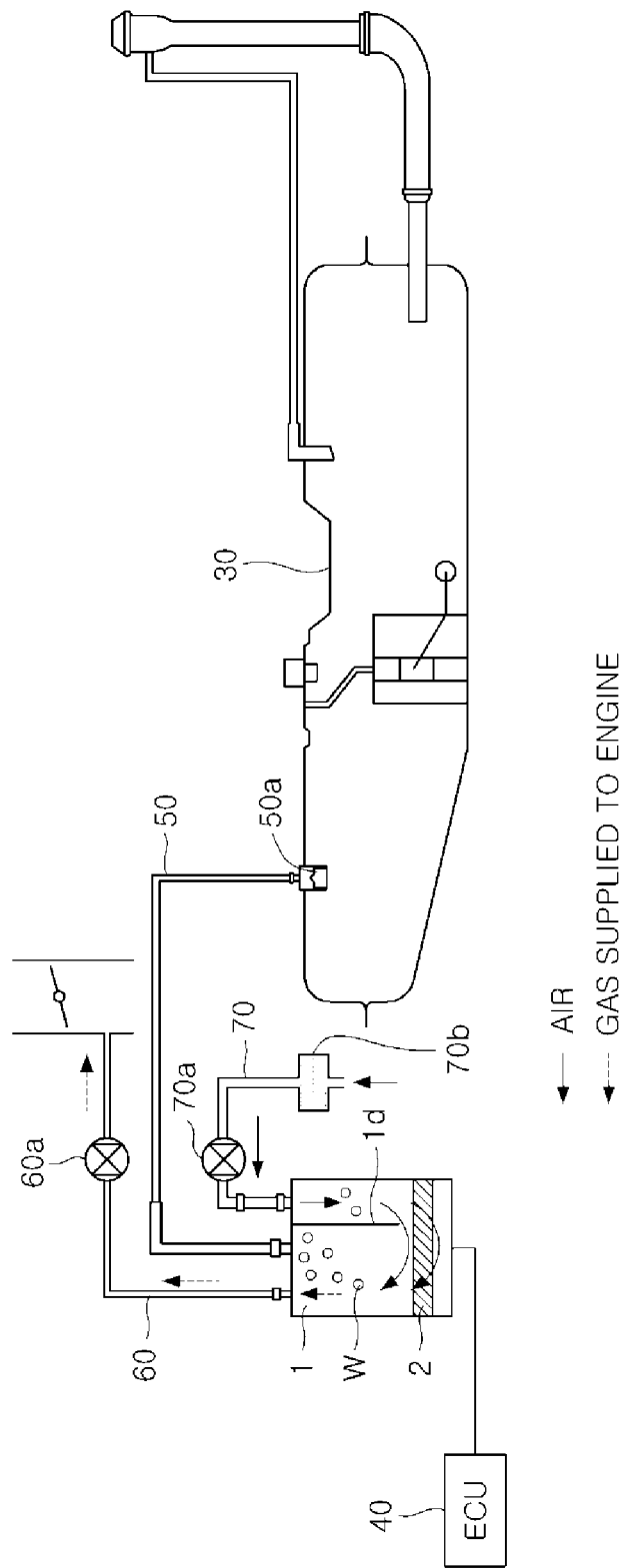
FIG. 6 is a view showing when the exemplary hydrocarbon (HC) of the heater-integrated canister unit according to the present invention is detached and supplied to an engine.

FIG. 6 is a view showing when the hydrocarbon (HC) of the heater-integrated canister unit according to various embodiments of the present invention is absorbed/detached and supplied to an engine, which shows traveling or idling state.

As shown in the figure, evaporation gas line 50 connecting fuel tank 30 with canister 1 is closed by closed valve 50a, while the engine intake pressure produced in evaporation gas exhaust line 60 by open valve 60a is also applied to canister 1.

As described above, since the engine intake pressure produced in canister 1 is also applied to external air line 70, flow of external air sucked into canister 1 through air filter 70b, with valve 70a open, is generated in external air line 70.

In this operation, temperature controller 2 is activated by ECU 40 and increases the internal temperature of canister 1.

That is, the current supplied through connector 11 by the control of ECU 40 heats heater plate 3 composed of the pair of upper and lower panels 33a and 33b forming the positive electrode and the negative electrode, and as heater plate 3 is heated, the PTC type of heater 10 generates heat.

The temperature of the external air flowing inside is increased by heat transfer from hater 10 and the temperature of the charcoal W correspondingly increases, and the endothermic reaction of the charcoal W becomes active by the increase in temperature, such that detachment of the absorbed hydrocarbon HC becomes more active.

Accordingly, the amount of hydrocarbon (HC) detached from the charcoal W increases in canister 1.

Since the engine intake pressure is applied to evaporation gas exhaust line 60 connected to canister 1, the detached hydrocarbon HC and the air flows out of canister 1 to evaporation gas exhaust line 60 and is then discharged to an intake manifold through valve 60a.

As described above, in various embodiments, it is possible to satisfy PZEV, which is a reinforced environmental rule in North America, with only one canister 1, by increasing the performance and capacity of canister 1 with increase in absorbing/detaching efficiency of hydrocarbon (HC), by indirectly heating the charcoal W with temperature controller 2 where current is supplied. In particular, it is possible prevent decrease of capacity of fuel tank 30 which necessarily occurs when using two canisters, and also prevent the situation that a vehicle cannot be filled with oil by increase in resistance of the air exhaust channel in fuel tank 30.

Figure 7:
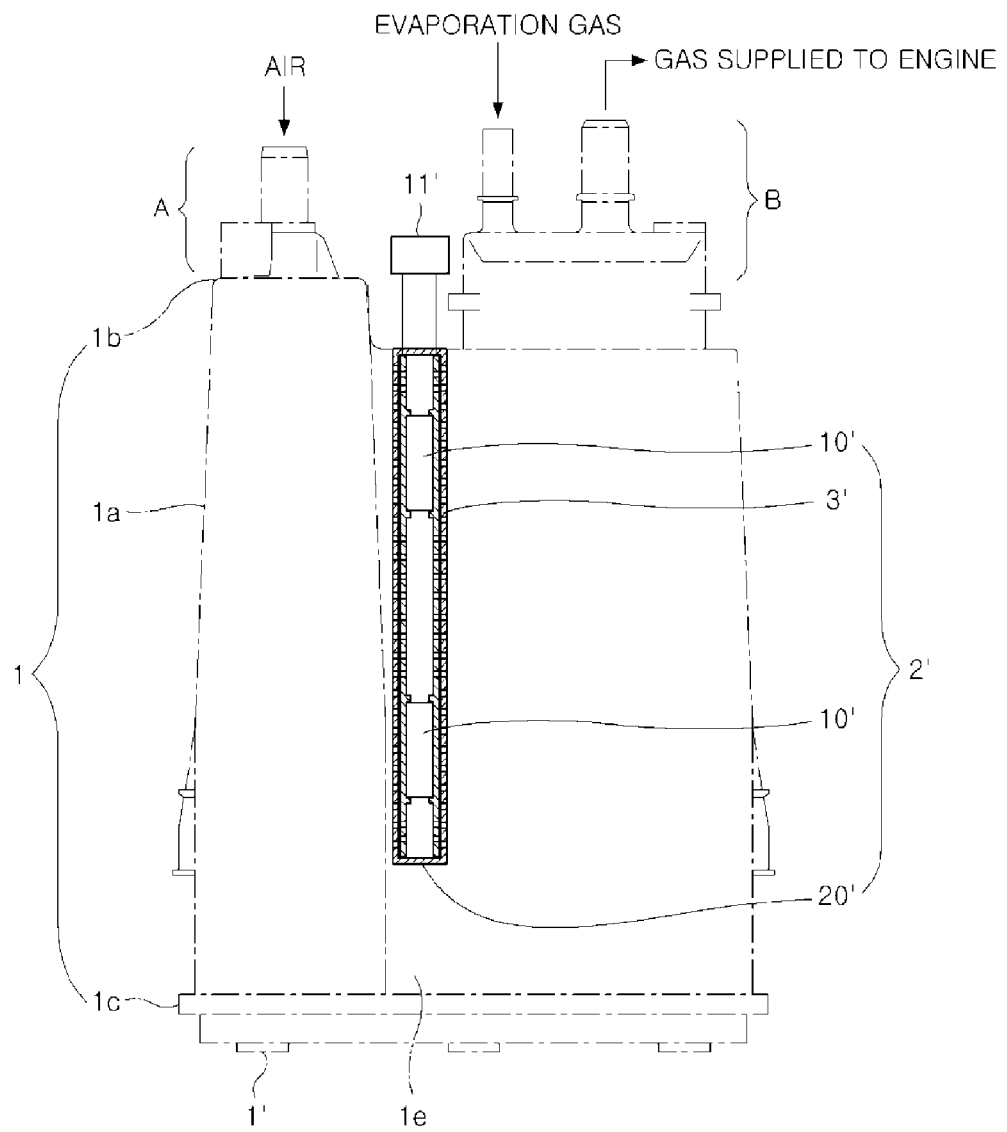
FIG. 7 is a view showing the configuration of another exemplary heater-integrated canister unit according to the present invention.

FIG. 7 is a view showing the configuration of a heater-integrated canister unit according to a other embodiments of the present invention.

A canister 1 according to various embodiments is a heater-integrated canister with a temperature controller 2' exposed to the outside of canister 1.

A seating slot 1e where temperature controller 2' is disposed is formed in canister 1, in detail, seating slot 1e is formed at separator 1d that divides the inside of housing body 1a filled with charcoal W.

Seating slot 1e has a cross-sectional structure that can fix temperature controller 2' by pushing and fitting temperature controller 2'.

Temperature controller 2', which may be the same as temperature controller 2 described above, includes a hater plate 3 composed of a pair of upper and lower panels 33a' and 33b' having a plurality of projections 3a' and air holes 3b' and forming a positive electrode and a negative electrode, a PTC type of heater 10 positioned on heater fixing bosses 6' of upper and lower panels 33a' and 33b', and a connector 11' connected to upper panel 33a' as a positive electrode and lower panel 33b' as a negative electrode.

However, unlike temperature controller 2 equipped with elastic member 20 described above, temperature controller 2' is covered with case 20', without using elastic member 20.

The length of temperature controller 2' is not larger than the entire length of canister 1 and may be the same as the height of the charcoal W in the canister 1.

Figure 8:
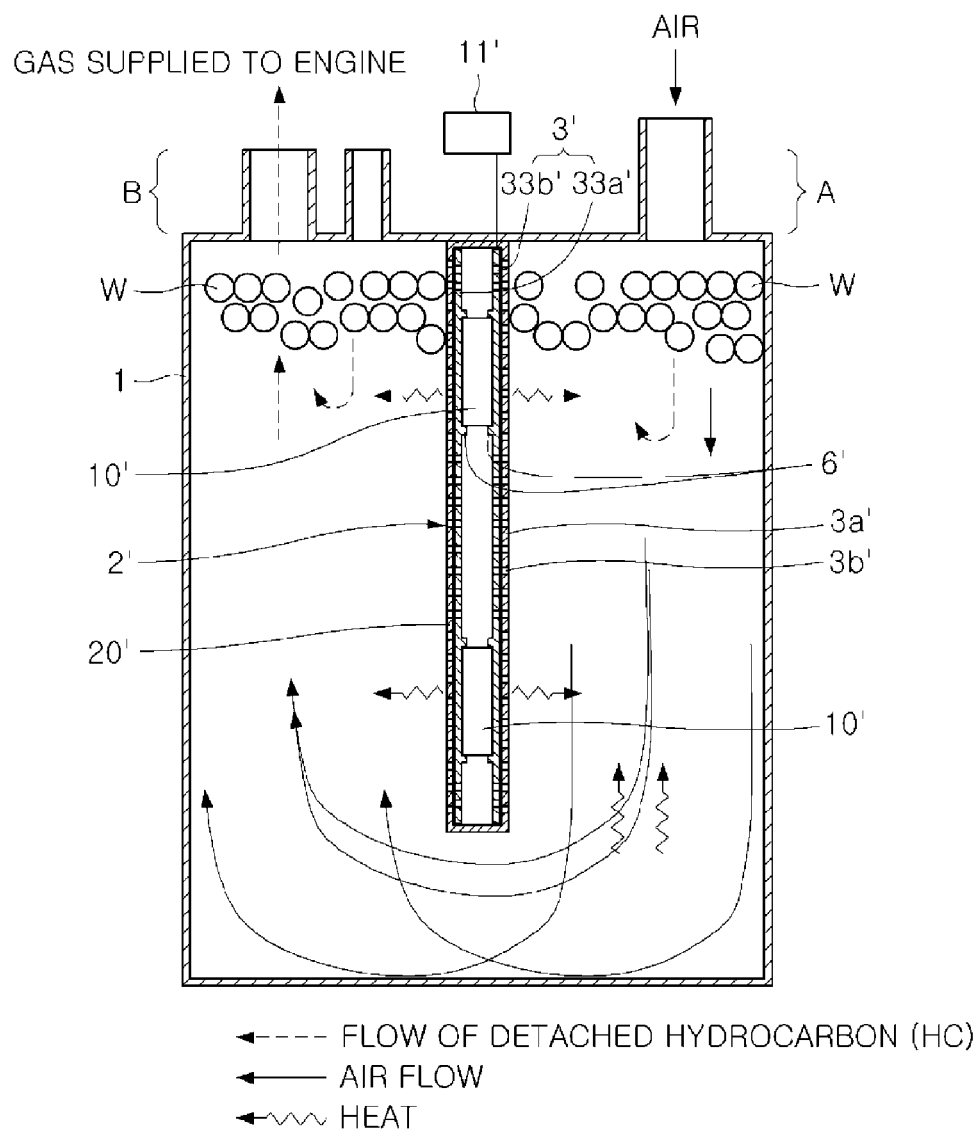
FIG. 8 is a view showing the operation of another exemplary heater-integrated canister unit according to the present invention.

FIG. 8 is a view showing the operation of the heater-integrated canister unit according to other embodiments of the present invention.

Temperature controller 2' is disposed outside canister 1 and an ECU controlling current supply is connected to connector 11' connected to temperature controller 2'.

The current supplied to temperature controller 2' through connector 11' heats heater plate 3' composed of the pair of upper and lower panels 33a' and 33b' forming the positive electrode and the negative electrode, and as heater plate 3' is heated, the PTC type of heater 10' generates heat.

The heat generated from heater 10' is transferred to the internal space of canister 1 and heats air flowing inside from the outside and the air heated in the internal space increases the temperature of the charcoal W.

As the temperature of the charcoal W increases, absorption/detachment of absorbed hydrocarbon HC increases in the charcoal W absorbing/detaching hydrocarbon HC in an endothermic reaction, such that canister 1 can detach a large amount of hydrocarbon HC only by increasing the temperature of the charcoal W.

Figure 9:
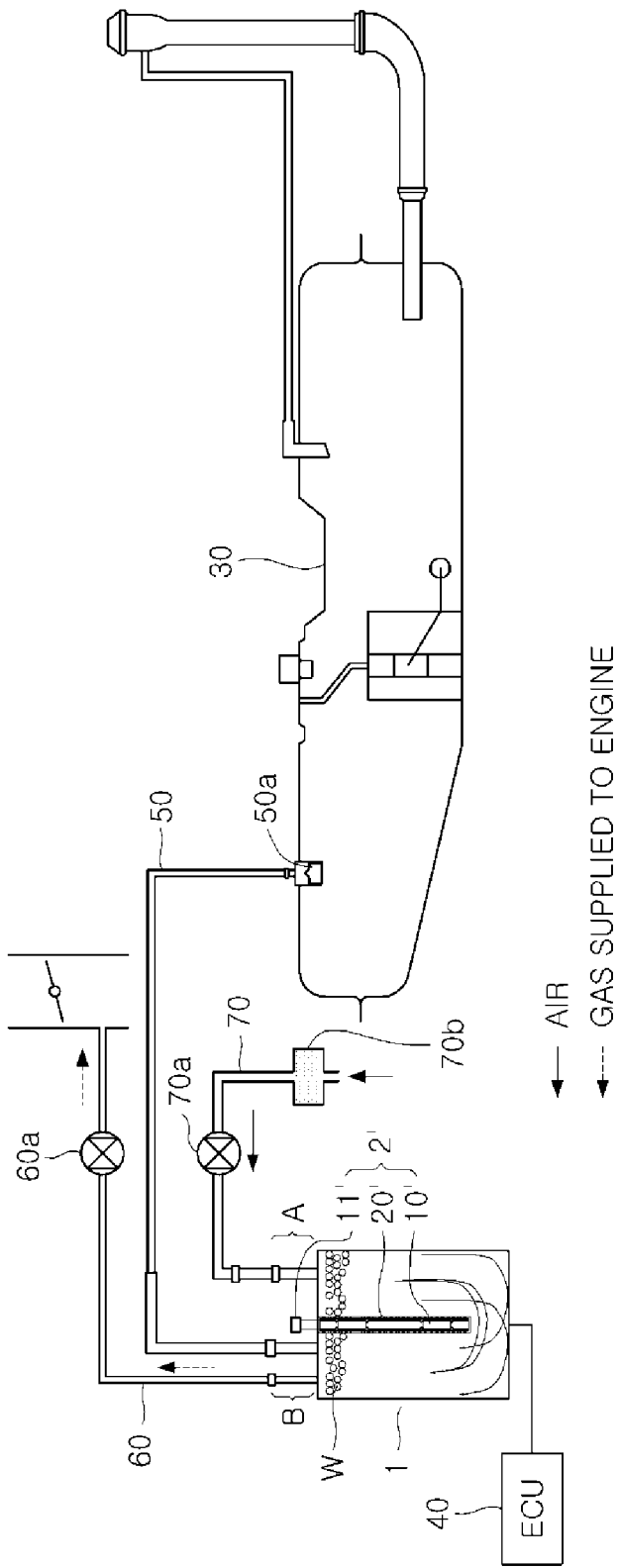
FIG. 9 is a view showing when the exemplary hydrocarbon (HC) of the heater-integrated canister unit according to the present invention is detached and supplied to an engine.
Figure 10:
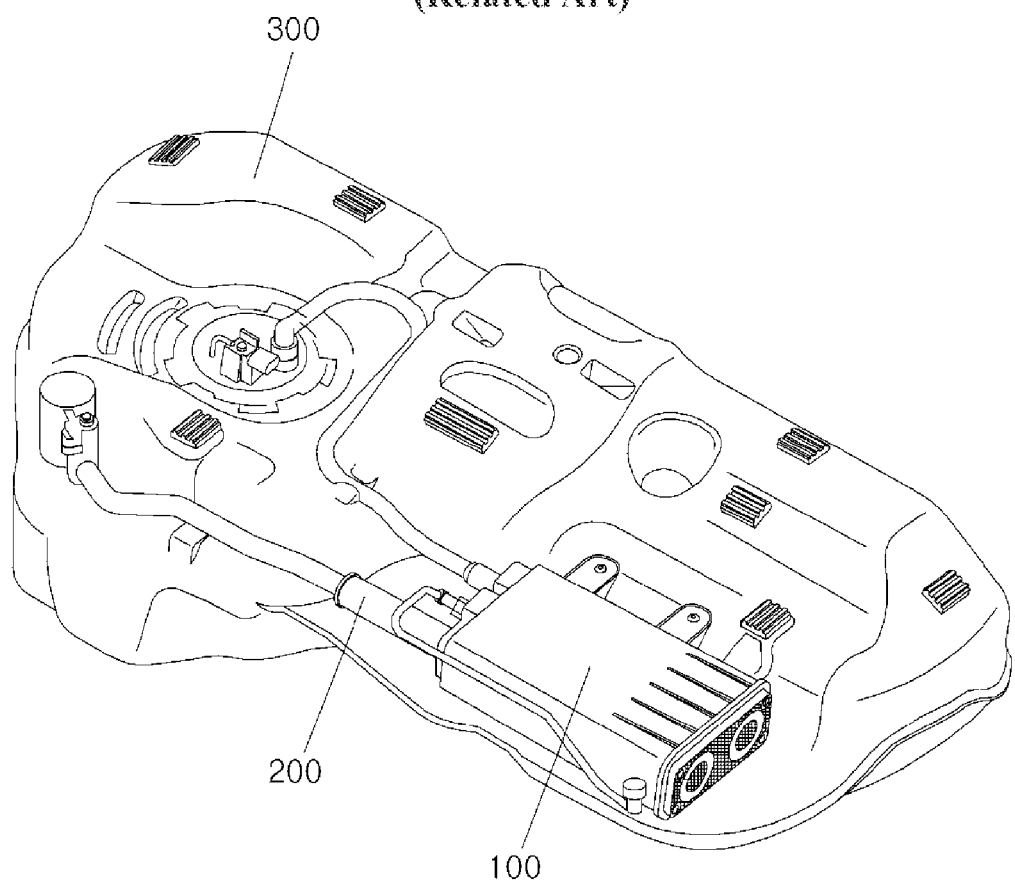
FIG. 10 is a view showing a fuel tank installed in a canister with increased capacity and performance according to the related art.

FIG. 9 is a view showing when the hydrocarbon (HC) of the heater-integrated canister unit according to various embodiments of the present invention is absorbed/detached and supplied to an engine, which shows traveling or idling state.

Evaporation gas line 50 connecting fuel tank 30 with canister 1 is closed by closed valve 50a, while the engine intake pressure produced in evaporation gas exhaust line 60 by open valve 60a is also applied to canister 1.

As described above, since the engine intake pressure produced in canister 1 is also applied to external air line 70, flow of external air sucked into canister 1 through air filter 70b, with valve4 70a open, is generated in external air line 70.

In this operation, temperature controller 2' is activated by ECU 40 and increases the internal temperature of canister 1.

That is, the current supplied through connector 11' by the control of ECU 40 heats heater plate 3' composed of the pair of upper and lower panels 33a' and 33b' forming the positive electrode and the negative electrode, and as heater plate 3' is heated, the PTC type of heater 10' generates heat.

The temperature of the external air flowing inside is increased by heat transfer from hater 10' and the temperature of the charcoal W correspondingly increases, and the endothermic reaction of the charcoal W becomes active by the increase in temperature, such that detachment of the absorbed hydrocarbon (HC) becomes more active.

Accordingly, the amount of hydrocarbon (HC) detached from the charcoal W increases in canister 1.

Since the engine intake pressure is applied to evaporation gas exhaust line 60 connected to canister 1, the detached hydrocarbon HC and the air flows out of canister 1 to evaporation gas exhaust line 60 and is then discharged to an intake manifold through valve 60a.

As described above, in various embodiments as well, it is possible to satisfy PZEV, which is a reinforced environmental rule in North America, with only one canister 1, by increasing the performance and capacity of canister 1 with increase in absorbing/detaching efficiency of hydrocarbon (HC), by indirectly heating the charcoal W with temperature controller 2' where current is supplied. In particular, it is possible prevent decrease of capacity of fuel tank 30 which necessarily occurs when using two canisters, and also prevent the situation that a vehicle cannot be filled with oil by increase in resistance of the air exhaust channel in fuel tank 30.

For convenience in explanation and accurate definition in the appended claims, the terms "upper" or "lower", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heater-integrated canister unit, comprising:
a canister;
a temperature controller integrally coupled with the canister to indirectly heat a charcoal inside the canister by increasing a temperature of a space in the canister; and
an electronic control unit controlling a current supplied to the temperature controller;
wherein the temperature controller comprises a heater plate transmitting the current by forming a positive electrode and a negative electrode, a connector supplying the current to the heater plate, and a heater generating heat on the heater plate; and
wherein the heater plate includes a pair of thermally conductive upper and lower panels forming the positive electrode and the negative electrode, and the upper and lower panels have a plurality of projections and air holes.

2. The heater-integrated canister unit as defined in claim 1, wherein the temperature controller may be disposed at the opposite side of an evaporation gas intake port in the canister and support the charcoal.

3. The heater-integrated canister unit as defined in claim 2, further comprising:
a cover to enclose the temperature controller and the canister; and
at least one elastic member disposed between the temperature controller and the cover.

4. The heater-integrated canister unit as defined in claim 1, wherein the temperature controller may be coupled to an outside of the canister by a seating slot formed in the canister.

5. The heater-integrated canister unit as defined in claim 1, wherein the heater is of a PTC (Positive Temperature Coefficient) type and at least one heater is provided.

6. The heater-integrated canister unit as defined in claim 4, wherein the temperature controller is covered with a case.

\* \* \* \* \*